(12) United States Patent
Beers (10) Patent No.: US 8,373,338 B2
(45) Date of Patent: *Feb. 12, 2013

(54) ENHANCED COLOR CONTRAST LIGHT SOURCE AT ELEVATED COLOR TEMPERATURES

(75) Inventor: William Winder Beers, Chesterland, OH (US)

(73) Assignee: General Electric Company, Schenectady, NY (US)

( * ) Notice: Subject to any disclaimer, the term of this patent is extended or adjusted under 35 U.S.C. 154(b) by 811 days.

This patent is subject to a terminal disclaimer.

(21) Appl. No.: 12/256,227

(22) Filed: Oct. 22, 2008

(65) Prior Publication Data

US 2010/0096998 A1    Apr. 22, 2010

(51) Int. Cl.
*H01J 1/63* (2006.01)
*H01J 1/68* (2006.01)
*H01J 61/44* (2006.01)
*H01J 61/48* (2006.01)

(52) U.S. Cl. .................. 313/485; 313/487; 313/501

(58) Field of Classification Search ........... 313/485–489
See application file for complete search history.

(56) References Cited

U.S. PATENT DOCUMENTS

| | | | |
|---|---|---|---|
| 4,847,533 | A | 7/1989 | Hoffman |
| 6,222,312 | B1 | 4/2001 | Ghosh et al. |
| 2005/0179358 | A1* | 8/2005 | Soules et al. ............ 313/487 |
| 2005/0258733 | A1 | 11/2005 | Igarashi et al. |

FOREIGN PATENT DOCUMENTS

| | | |
|---|---|---|
| CA | 2560656 A1 | 10/2005 |
| JP | 2007141737 A | 6/2007 |

OTHER PUBLICATIONS

Phosphor Mixture for Colour-Variable Fluorescent Lamp, IP.Com Journal, IP.Com Inc., West Henrietta, NY, UA, Oct. 3, 2006, XP013116106, ISSN: 1533-0001, p. 3; Figures 4,5.

"Toward an Improved Color Rendering Metric", Fifth International Conference on Solid State Lighting, Edited by Ian T. Ferguson, et al, SPIE vol. 5941, PO Box 10 Bellingham WA 98227-0010 USA, 2005, XP040209336 Cited in the Application the Whole Document.

International Search Report issued in connection with corresponding PCT Application No. PCT/US2009/055806 on Apr. 27, 2010.

* cited by examiner

*Primary Examiner* — Mariceli Santiago
(74) *Attorney, Agent, or Firm* — GE Global Patent Operation; Peter T. DiMauro (57) ABSTRACT

A lamp having improved color quality scale, especially at elevated color temperatures, is provided. The light generated by the light-emitting elements of the lamp, when the lamp is energized, has delta chroma values for fifteen color samples of the color quality scale within select parameters. The delta chroma values are measured in the CIE LAB color space.

31 Claims, 3 Drawing Sheets

ENHANCED COLOR CONTRAST LIGHT SOURCE AT ELEVATED COLOR TEMPERATURES

CROSS REFERENCE TO RELATED APPLICATIONS

The technology herein described relates to: co-pending U.S. patent application Ser. No. 11/873,463, filed on 17 Oct. 2007 and titled "Enhanced Color Contrast Light Source"; and to: co-pending U.S. patent application Ser. No. 12/246,110, filed on 6 Oct. 2008, also titled "Enhanced Color Contrast Light Source", both of which are hereby incorporated by reference.

FIELD OF THE INVENTION

The present invention relates to a light source, and more particularly to a light source having enhanced color contrast at high correlated color temperatures.

BACKGROUND

Fluorescent lighting provides an energy-efficient alternative to common incandescent lighting. However, the adoption of fluorescent lighting has been hindered in certain applications. The quality of object color under fluorescent lighting is an important aspect of the value of the light source. There are certain applications where good color rendition is very important. Such applications are illumination in commercial units, where the true color perception of products are desired, such as clothing stores, fresh food stores, and photographic and cinema studios.

In general, the quality of object color has been described in terms of color rendering, which is a measure of the degree to which the psycho-physical colors of objects illuminated by a light source conform to those of a reference illuminant for specified conditions. Color rendering as used here refers to the accurate representation of object colors compared to those same objects under a reference source. Some light sources, for example, fluorescent lighting, have been known to have poor color rendering, such that they can produce visible light having muted light in the red region of the spectrum and an overemphasized amount of light in the yellow region. Such lighting has been observed to produce cold or sterile light and light that generally washes out colors of the items being illuminated.

Light sources have also been described in terms of their apparent color, expressed as color temperature, which is the temperature of a black body that emits radiation of about the same chromaticity as the radiation considered. A light source having a color temperature of 3000 kelvin has a larger red component than a light source having a color temperature of 4100 kelvin. White light typically has a color temperature (more precisely, a correlated color temperature, CCT) of between about 4000 and 8000 K. White light with a color temperature of 4000 has a yellowish color. White light with a CCT of 8000 K is more bluish in color, and may be referred to as "cool white". There is some evidence to suggest that light having a substantial blue component has an effect upon the human body in terms of sleep cycles and hormonal effects. It is generally known, in particular, that very blue light can be effective in adjusting the human circadian rhythm.

However, lamps having a high color temperature lamps (and thus having a substantial blue component), are frequently considered to be objectionable in terms of their color rendering of objects, i.e., their appearance. What is desired, then, is a light source having a spectrum with improved color rendering even at high or very high color temperatures.

SUMMARY OF THE INVENTION

In one aspect of embodiments of the invention, is provided a lamp which when energized exhibits a correlated color temperature of between about 3000 kelvin to about 4500 kelvin and having an improved color quality scale. The lamp comprises at least one light-emitting element having a light emission when energized, with the proviso that the lamp does not comprise an incandescent light-emitting element. When the lamp is energized it generates light with a total light emission having delta chroma values as follows: at least two color samples of the CQS are within the parameters −5 to 2 for VS1, −2 to 5 for VS2, and −5 to 0 for VS3; at least one color sample of the CQS is within the parameters −2.5 to 8 for VS4 and −2 to 15 for VS5; at least two color samples of the CQS are within the parameters 0 to 21 for VS6, 3 to 22 for VS7, and 2 to 7 for VS8; at least two color samples of the CQS are within the parameters −6 to 5.5 for VS9, −4 to 5 for VS 10, and −4 to 2 for VS11; at least one color sample of the CQS is within the parameters −0.5 to 5 for VS12 and 1 to 12 for VS 13; and at least one color sample of the CQS is within the parameters −7 to 4 for VS14 and −7 to 7 for VS 15. The delta chroma values are measured in the CIE LAB space.

In another aspect of embodiments of the invention is provided a lamp which when energized exhibits a correlated color temperature of between about 4500 kelvin to about 7500 kelvin and having an improved color quality scale. The lamp comprises at least one light-emitting element having a light emission when energized, with the proviso that the lamp does not comprise an incandescent light-emitting element. When the lamp is energized said lamp generates light with a total light emission having delta chroma values as follows: at least two color samples of the CQS are within the parameters −5 to 2 for VS1, −2 to 4 for VS2, and −5 to 3 for VS3; at least one color sample of the CQS is within the parameters −2 to 5 for VS4 and −2 to 15 for VS5; at least two color samples of the CQS are within the parameters 0 to 20 for VS6, 1 to 22 for VS7, and 2 to 8 for VS8; at least two color samples of the CQS are within the parameters −5.5 to 5.5 for VS9, −5 to 4 for VS10, and −4 to 1 for VS13; at least one color sample of within the parameters −1.5 to 6 for VS12 and 0.5 to 12 for VS 13; and at least one color sample of the CQS is within the parameters −5 to 6 for VS14 and −5.5 to 5 for VS15. The delta chroma values are measured in the CIE LAB space.

In yet another aspect of embodiments of the invention is provided a lamp which when energized exhibits a correlated color temperature of between about 7500 kelvin to about 20000 kelvin and having an improved color quality scale. The lamp comprises at least one light-emitting element having a light emission when energized, with the proviso that the lamp does not comprise an incandescent light-emitting element. When said lamp is energized said lamp generates light with a total light emission having delta chroma values as follows: at least two color samples of the CQS are within the parameters −2 to 2 for VS1, 0 to 5 for VS2, and −5 to 5.5 for VS3; at least one color sample of the CQS is within the parameters −2.5 to 4 for VS4 and −3 to 15 for VS5; at least two color samples of the CQS are within the parameters 1 to 22 for VS6, 0 to 23 for VS7, and 4 to 11 for VS8; at least two color samples of the CQS are within the parameters −4.5 to 6 for VS9, −4 to 5 for VS10, and −4 to 1 for VS11; at least one color sample of the CQS is within the parameters −1.5 to 6 for VS12 and 1 to 13 for VS13; and at least one color sample of the CQS is within the parameters −3 to 7 for VS14 and −3 to 8 for VS15. The delta chroma values are measured in the CIE LAB space.

Other features and advantages of this invention will be better appreciated from the following detailed description.

DETAILED DESCRIPTION

As used herein, the term "lamp" and "light source" will be utilized substantially interchangeably, to refer to any source of visible and/or ultraviolet light which can be generated by at least one light-emitting element having a light emission when energized and selected from the group consisting of phosphor, vapor discharge, high intensity discharge, and combinations thereof. The term "total light emission" refers to the combined light emitted from a lamp having one or more light-emitting elements, as defined above. If the lamp (for example) contains only one light emitting element (e.g., a white-light emitting element), such light emission is included in the definition of the term total light emission. If a lamp contains more than one light emitting element, the combination of the light from all the elements will also be an example of what may constitute a total light emission. Total light emission may also refer to the combined light emitted from a lamp having one or more light-emitting elements as defined above, and further including light from other types of elements (e.g., LED and/or OLED). It is a preferred embodiment of the invention that the lamp does not comprise an incandescent light-emitting element.

It is generally known that conventional incandescent lamps generate an amount of light in the yellow region of the spectrum which may leading to unappealing color rendering. An improvement upon such conventional incandescent lamps has employed filters to remove or filter out part of the yellow light, through the inclusion of neodymium in the glass envelope of such lamps. Examples of such lighting systems include the line of REVEAL™ light bulbs produced by General Electric Company. One pertinent feature of the spectrum of REVEAL™ bulbs is the deep depression in the yellow region, resulting from the filtration by the neodymium glass. This deficiency in the yellow region leads to increased red-green color contrast when objects are viewed under this lamp, in comparison to a regular incandescent bulb. This has been found to be very appealing to customers.

According to embodiments of the present invention, lamps are provided which may have an enhanced color contrast which compares favorably to the REVEAL™ bulbs, however, such lamps are subject to the proviso that they do not comprise an incandescent light-emitting element. The term "incandescent light-emitting element" is generally understood by persons skilled in the field to mean those elements which emit light and/or thermal radiation due to heating. These include those well known light-emitting elements having a filament which glows upon heating induced by an electric current passing through the filament. According to embodiments of the present invention, the term "lamp" includes, but is not limited to, fluorescent lamps, discharge lamps, and combinations thereof, or the like.

A lamp according to embodiments of the present disclosure can be a vapor discharge lamp (e.g., a low pressure mercury or mercury-free vapor discharge lamp), many of which are generally well known in the art. Such a lamp, in some embodiments, can comprise a light-transmissive envelope, which may be linear and/or cylindrical, and which can be made of glass or another light-transmissive material and may have a circular cross section. The inner surface of the envelope can be provided with a reflective barrier coating or layer for improved light softness and brightness maintenance with age. The inner surface of the envelope (or the inner surface of the barrier layer, if present) is typically provided with a phosphor layer. Such a phosphor layer typically comprises a rare earth phosphor layer, such as a multi-phosphor layer, or other phosphor layer. Lamps of the above-described type can be a fluorescent lamp, such as a T12, T10 or T8 lamp, which are generally known in the art. Alternatively, the lamp can be nonlinear, for example circular or otherwise curvilinear in shape, or have a nominal outer diameter less than one inch. In this alternative case, the lamp can have other lengths or it may be a compact fluorescent lamp (CFL) having a folded or wrapped topology so that the overall length of the lamp is much shorter than the unfolded length of the glass tube.

In yet another embodiment of the present disclosure, the lamp can be a high-intensity discharge (HID) lamp. Such HID lamp may include, for example, mercury vapor, metal halide, low-pressure sodium or high-pressure sodium lamps. HID lamps produce light by generating an electric arc across two electrodes that are generally located inside a tube, such as a fused quartz or fused alumina tube. The tube is filled with gas and metals, as generally known in the art. The metals generate light when the lamp is activated.

In a further embodiment of the present disclosure, the lamp can be a fluorescent or CFL lamp, or a vapor discharge or HID lamp, supplemented with light from one or more LED and/or an OLED (organic electroluminescent device) within the lamp. For instance, a combination of LED-generated light and discharge-activated, phosphor-converted light may be used to produce visible light having enhanced color contrast. In such combination, an LED can be mounted at a convenient place in a fluorescent or CFL lamp to add to (or supplement) light in select wavelength regions of the visible spectrum, such as a portion of the red region, to the light being generated by the phosphor composition coated on the envelope of a lamp.

In embodiments of the disclosure, any of the above lamps will exhibit enhanced or improved color contrast. The color appearance of a lamp, per se (as opposed to objects illuminated by such lamp) is described by its chromaticity coordinates or color coordinates, which, as would be understood by those skilled in the art, can be calculated from its spectral power distribution according to standard methods. This is specified according to CIE, *Method of measuring and specifying color rendering properties of light sources* (2nd ed.), Publ. CIE No. 13.2 (TC-3, 2), Bureau Central de la CIE, Paris, 1974. (CIE is the International Commission on Illumination, or, Commission Internationale d'Eclairage). The CIE standard chromaticity diagram is a two-dimensional graph having x and y coordinates. This standard diagram includes the color points of black body radiators at various temperatures. The locus of black body chromaticities on the x,y-diagram is known as the Planckian locus. Any emitting source represented by a point on this locus may be specified by a color temperature, with units of kelvin. A point near but not on this Planckian locus can be characterized by a correlated color temperature (CCT), because lines can be drawn from such points to intersect the Planckian locus at this color temperature such that all points look to the average human eye as having nearly the same color. Therefore, in sum, lamps can be characterized, at least in part, in terms of color coordinates and CCT.

According to embodiments of the present disclosure, there are provided lamps or light sources which provide light having enhanced color contrast or chroma. The blend of light-emitting elements in the lamp provides light that is useful in illuminating objects such that the objects appear appealing.

Lamps according the embodiments of the present disclosure may include one light emitting element, or may include a blend of light-emitting elements, and in either case generate light having an enhanced color contrast. In particular, the color contrast of the light is characterized such that it has delta chroma (Δ-chroma) values, as described below, falling within certain parameters for each of the color samples utilized in the Color Quality Scale (CQS), a scale which will be also be further described hereinunder. As the term is used herein, "chroma" values are measured in the CIE LAB space. The chroma values can be calculated by conventional techniques, for example, in the CIE LAB color space. For example, the CIE 1976 a,b chroma value is calculated as $C^*_{ab}=[(a^*)^2+(b^*)^2]^{1/2}$, as would be well known to those skilled in the art, and as may be found in standard handbooks in the field such as Illuminating Engineering Society of North America Lighting Handbook (ISBN-10: 0-87995-150-8).

The CQS, as developed by the National Institute of Standards and Technology (NIST), uses fifteen Munsell color samples to evaluate aspects of the color of objects illuminated by a light source, such as that similarly done by the better-known Color Rendering Index (CRI). Now, the older CRI system utilizes fourteen standard color samples (denoted $R_1$-$R_{14}$, or $R_i$ in general) to evaluate the color rendering. Typically, when a color rendering score according to the CRI is reported, it is a "general color rendering index" (termed Ra), which is the average of the $R_i$ values for only the first eight samples, all of which are at low to medium chromatic saturation. The CRI system of measuring object color, however, suffers from disadvantages; for example, the red region of the color space is non-uniform and the eight color samples used to calculate the Ra are not highly saturated. Color rendering of saturated colors can be very poor even when the Ra value is high. In other words, one may optimize the spectrum of a lamp according to a very high value of Ra, and yet the actual color rendering is much poorer; because the eight color samples are simply averaged to obtain a Ra value, a lamp can score high even though it renders one or two colors very poorly. This problem arises because too few samples of high chromatic saturation are used to calculate Ra.

CQS overcomes these disadvantages of the CRI system and is therefore used according to embodiments of this disclosure, as the system to evaluate the aspects of object color. The CQS system uses an overall $Q_a$ value that incorporates the color appearance of a total of fifteen color samples, of which all have relatively high chromatic saturation and are substantially evenly distributed in the color space. The $Q_a$ value generally corresponds to the average of the individual CQS values for each of the fifteen color samples. Calculation of the $Q_a$ value is more fully described in W. Davis and Y. Ohno, "Toward an improved color rendering metric," Proc. SPIE Fifth International Conference on Solid State Lighting, 5941, 2005, the entire contents of which are hereby incorporated by reference.

As set by NIST, the CQS utilizes a standard set of fifteen saturated Munsell color samples (sometimes referred to as color "chips") having the hue value and chroma shown in Table I.

TABLE I

| VS of the CQS | Hue value | Chroma |
|---|---|---|
| VS1 | 7.5 P 4 | 10 |
| VS2 | 10 PB 4 | 10 |
| VS3 | 5 PB 4 | 12 |
| VS4 | 7.5 B 5 | 10 |
| VS5 | 10 BG 6 | 8 |
| VS6 | 2.5 BG 6 | 10 |
| VS7 | 2.5 G 6 | 12 |
| VS8 | 7.5 GY 7 | 10 |
| VS9 | 2.5 GY 8 | 10 |
| VS10 | 5 Y 8.5 | 12 |
| VS11 | 10 YR 7 | 12 |
| VS12 | 5 YR 7 | 12 |
| VS13 | 10 R 6 | 12 |
| VS14 | 5 R 4 | 14 |
| VS15 | 7.5 RP 4 | 12 |

These values (hue value/chroma) respectively correspond to the fifteen Munsell color samples of the CQS, which are labeled as VS1 through VS15 inclusive (i.e. VS1-VS15). In other words, VS1 corresponds to the first standard Munsell color sample, VS2 corresponds to the second Munsell color sample, and so on. The hue labels have the following descriptions: "P" is purple, "PB" is purple-blue, "B" is blue, "BG" is blue-green, "G" is green, "GY" is green-yellow, "Y" is yellow, "YR" is yellow-red, "R" is red and "RP" is red-purple.

According to embodiments of the present invention, the CQS is used in the following manner. A lamp (or other light source) generates light having chroma values for each color chip, at a given correlated color temperature (CCT) and at a given color point (or chromaticity coordinates) for the light. These chroma values are then compared with a reference set of chroma values for each color chip generated using a reference source. That reference source is Planckian blackbody radiation having both the same color temperature, and the same color point (chromaticity coordinates) as the light source under study. The delta chroma (Δ-chroma) value for each color chip under illumination by the lamp or light source under study, is the arithmetic difference between the chroma value of lamp or light source, and the reference source chroma value.

According to embodiments, there are desirable delta chroma (Δ-chroma) values for the light emitted by the lamps of the present invention. The delta chroma values are useful for identifying color perceptions and evaluating the enhanced color contrast of the lamp or light sources described herein. The delta chroma values can be used to select, make, and/or evaluate a lamp according to embodiments of the present disclosure.

A particular embodiment of the disclosure is directed to a lamp which when energized exhibits a correlated color temperature of between about 3000 kelvin to about 4500 kelvin, wherein when the lamp is energized it generates light having delta chroma values for the color samples of the CQS chosen from the parameters in Table II. This will herein be referred to as the low color temperature embodiment.

TABLE II

| Broad Low Color Temperature Embodiment | |
|---|---|
| Choose at least two of the following three: | |
| VS1 | −5 to 2 |
| VS2 | −2 to 5 |
| VS3 | −5 to 0 |

TABLE II-continued

Broad Low Color Temperature Embodiment

| Choose at least one of the following two: | |
|---|---|
| VS4 | −2.5 to 8 |
| VS5 | −2 to 15 |

| Choose at least two of the following three: | |
|---|---|
| VS6 | 0 to 21 |
| VS7 | 3 to 22 |
| VS8 | 2 to 7 |

| Choose at least two of the following three: | |
|---|---|
| VS9 | −6 to 5.5 |
| VS10 | −4 to 5 |
| VS11 | −4 to 2 |

| Choose at least one of the following two: | |
|---|---|
| VS12 | −0.5 to 5 |
| VS13 | 1 to 12 |

| Choose at least one of the following two: | |
|---|---|
| VS14 | −7 to 4 |
| VS15 | −7 to 7 |

Provided that a lamp of the stated CCT generates light having delta chroma values within the VS values shown in accordance with the entries of Table II, it is in accordance with the low color temperature embodiment. To aid in interpretation, the following is a restatement of Table II. Lamps of the low color temperature embodiment exhibit delta chroma values for any two or three of the CQS samples VS1 through VS3 as specified in Table II; and simultaneously they exhibit delta chroma values for any one or two of the CQS samples VS4 through VS5 as specified in Table II; and simultaneously they exhibit delta chroma values for two or three of the CQS samples V6 through V8; and simultaneously they exhibit delta chroma values for two or three of the CQS samples V9 through V11; simultaneously they exhibit delta chroma values for one or two of the CQS samples V12 through V13; simultaneously they exhibit delta chroma values for one or two of the CQS samples V14 through V15. To ascertain whether a lamp is in accordance with this low color temperature embodiment, one may simply use the CQS system in the manner specified previously, and compare with values in the chart.

It is also within the scope of the low color temperature embodiment to make a lamp having (or exhibiting) all of the VS values in Table II, while also retaining advantageously enhanced color contrast. For example, one of skill can adapt, select or make a lamp having light which exhibits delta chroma values for all of the Munsell color samples of the CQS within the parameters of Table II. All of the foregoing benefit from the advantages of the present disclosure.

Another particular embodiment of the disclosure is directed to a lamp which when energized exhibits a correlated color temperature of between about 4500 kelvin to about 7500 kelvin, wherein when the lamp is energized it generates light having delta chroma values for the color samples of the CQS chosen from the parameters in Table III. This will herein be referred to as the medium color temperature embodiment.

TABLE III

Broad Medium Color Temperature Embodiment

| Choose at least two of the following three: | |
|---|---|
| VS1 | −5 to 2 |
| VS2 | −2 to 4 |
| VS3 | −5 to 3 |

| Choose at least one of the following two: | |
|---|---|
| VS4 | −2 to 5 |
| VS5 | −2 to 15 |

| Choose at least two of the following three: | |
|---|---|
| VS6 | 0 to 20 |
| VS7 | 1 to 22 |
| VS8 | 2 to 8 |

| Choose at least two of the following three: | |
|---|---|
| VS9 | −5.5 to 5.5 |
| VS10 | −5 to 4 |
| VS11 | −4 to 1 |

| Choose at least one of the following two: | |
|---|---|
| VS12 | −1.5 to 6 |
| VS13 | 0.5 to 12 |

| Choose at least one of the following two: | |
|---|---|
| VS14 | −5 to 6 |
| VS15 | −5.5 to 5 |

Provided that a lamp of the stated CCT generates light having delta chroma values within the VS values shown in accordance with the entries of Table III, it is in accordance with the medium color temperature embodiment.

It is also within the scope of the medium color temperature embodiment to make a lamp having (or exhibiting) all of the VS values in Table III, while also retaining advantageously enhanced color contrast. For example, one of skill can adapt, select or make a lamp having light which exhibits delta chroma values for all of the Munsell color samples of the CQS within the parameters of Table III. All of the foregoing benefit from the advantages of the present disclosure.

Yet another particular embodiment of the disclosure is directed to a lamp which when energized exhibits a correlated color temperature of between about 7500 kelvin to about 20000 kelvin, wherein when the lamp is energized it generates light having delta chroma values for the color samples of the CQS chosen from the parameters in Table IV. This will herein be referred to as the high color temperature embodiment.

TABLE IV

Broad High Color Temperature Embodiment

| Choose at least two of the following three: | |
|---|---|
| VS1 | −2 to 2 |
| VS2 | 0 to 5 |
| VS3 | −5 to 5.5 |

| Choose at least one of the following two: | |
|---|---|
| VS4 | −2.5 to 4 |
| VS5 | −3 to 15 |

| Choose at least two of the following three: | |
|---|---|
| VS6 | 1 to 22 |
| VS7 | 0 to 23 |
| VS8 | 4 to 11 |

TABLE IV-continued

Broad High Color Temperature Embodiment

Choose at least two of the following three:

| | |
|---|---|
| VS9 | −4.5 to 6 |
| VS10 | −4 to 5 |
| VS11 | −4 to 1 |

Choose at least one of the following two:

| | |
|---|---|
| VS12 | −1.5 to 6 |
| VS13 | 1 to 13 |

Choose at least one of the following two:

| | |
|---|---|
| VS14 | −3 to 7 |
| VS15 | −3 to 8 |

Provided that a lamp of the stated CCT generates light having delta chroma values within the VS values shown in accordance with the entries of Table IV, it is in accordance with the high color temperature embodiment.

It is also within the scope of the high color temperature embodiment to make a lamp having (or exhibiting) all of the VS values in Table IV, while also retaining advantageously enhanced color contrast. For example, one of skill can adapt, select or make a lamp having light which exhibits delta chroma values for all of the Munsell color samples of the CQS within the parameters of Table IV. All of the foregoing benefit from the advantages of the present disclosure.

In certain narrower embodiments, the lamps of the low color temperature embodiment may have delta chroma values for color samples of the CQS chosen in the manner set forth in Table V.

TABLE V

Narrower Low Color Temperature Embodiment

Choose at least two of the following three:

| | |
|---|---|
| VS1 | −5 to 2 |
| VS2 | −2 to 5 |
| VS3 | −4 to 1 |

Choose at least one of the following two:

| | |
|---|---|
| VS4 | −2.5 to 6 |
| VS5 | −2 to 13 |

Choose at least two of the following three:

| | |
|---|---|
| VS6 | 1 to 20 |
| VS7 | 3 to 21 |
| VS8 | 2 to 7 |

Choose at least two of the following three:

| | |
|---|---|
| VS9 | −6 to 5 |
| VS10 | −4 to 4 |
| VS11 | −4 to 2 |

Choose at least one of the following two:

| | |
|---|---|
| VS12 | 0 to 4 |
| VS13 | 2 to 10 |

Choose at least one of the following two:

| | |
|---|---|
| VS14 | −6 to 2 |
| VS15 | −7 to 6 |

In certain narrower embodiments, the lamps of the medium color temperature embodiment may have delta chroma values for color samples of the CQS chosen in the manner set forth in Table VI.

TABLE VI

Narrower Medium Color Temperature Embodiment

Choose at least two of the following three:

| | |
|---|---|
| VS1 | −5 to 0 |
| VS2 | −2 to 4 |
| VS3 | −4.5 to 2 |

Choose at least one of the following two:

| | |
|---|---|
| VS4 | −2 to 5 |
| VS5 | −2 to 13 |

Choose at least two of the following three:

| | |
|---|---|
| VS6 | 1 to 20 |
| VS7 | 2 to 21 |
| VS8 | 2 to 8 |

Choose at least two of the following three:

| | |
|---|---|
| VS9 | −5.5 to 5 |
| VS10 | −5 to 3 |
| VS11 | −4 to 1 |

Choose at least one of the following two:

| | |
|---|---|
| VS12 | −0.5 to 4 |
| VS13 | 1 to 10 |

Choose at least one of the following two:

| | |
|---|---|
| VS14 | −4 to 4 |
| VS15 | −5 to 3 |

In certain narrower embodiments, the lamps of the high color temperature embodiment may have delta chroma values for color samples of the CQS chosen in the manner set forth in Table VII.

TABLE VII

Narrower High Color Temperature Embodiment

Choose at least two of the following three:

| | |
|---|---|
| VS1 | −2 to 2 |
| VS2 | 0 to 5 |
| VS3 | −4 to 4 |

Choose at least one of the following two:

| | |
|---|---|
| VS4 | −1.5 to 3 |
| VS5 | −1 to 13 |

Choose at least two of the following three:

| | |
|---|---|
| VS6 | 1 to 20 |
| VS7 | 3 to 21 |
| VS8 | 4 to 11 |

Choose at least two of the following three:

| | |
|---|---|
| VS9 | −3.5 to 5 |
| VS10 | −3 to 5 |
| VS11 | −4 to 1 |

Choose at least one of the following two:

| | |
|---|---|
| VS12 | −1 to 5 |
| VS13 | 2 to 12 |

Choose at least one of the following two:

| | |
|---|---|
| VS14 | −3 to 6 |
| VS15 | −3 to 3 |

Typically for the embodiments of the present invention (for example, for the low-color-temperature, medium-color-temperature, or high-color temperature lamp embodiments), the total light emission can be a combination of emitted light from two or more light emitting elements, as previously described. For some such embodiments, the combination of light-emitting elements can comprise a red light-emitting element having a peak emission in the range of from about 590 to about 670 nm, a green light-emitting element having a peak emission in the range of from about 500 to about 570 nm, and a blue light-emitting element having a peak emission in the range of from about 430 to about 490 nm.

It is understood that it is possible for one element to emit light of two or more colors. For instance, a single element may emit both green and red light within the above ranges, and in combination with a blue light emitting element, can be combined to form a white total light emission according to the embodiments of the invention. Furthermore, it is understood that there may be more than three elements in a lamp, e.g., four elements emitting light in the red, amber, green, and blue regions, respectively. Yet furthermore, there may be four or more elements emitting light in the red, green, blue-green and blue regions. In a specific embodiment, the lamp may comprise a red light-emitting element having a peak emission in the range of from about 590 to about 670 nm, a green light-emitting element having a peak emission in the range of from about 500 to about 570 nm, and a blue light-emitting element having a peak emission in the range of from about 430 to about 490 nm, and in addition to these, also comprise a second green light-emitting element having a peak emission in the range of from about 530 to about 560 nm.

All permutations of elements which are within the level of skill in the field to accomplish substantially white-appearing light to be emitted by the total emission, are to be considered within the scope of embodiments of the disclosure, provided they exhibit the prescribed color rendering qualities.

For each of the aforesaid peak emissions, there are typically peak widths. For example, for each of the peak emission for said red light-emitting element, said green light-emitting element, and said blue light-emitting element, there is a half-value width of about 1 to about 100 nm. It is to be understood that this range of peak width is to be applicable to all combination of elements, including the RGB combination noted previously. More specifically, the half-value width may range from about 1 to about 50 nm; even more specifically, the half-value width may range from about 1 to about 20 nm. For instance, where a second green light emitting element is utilized, it may have a peak width for its peak emission having a half-value width of about 1 to about 20 nm.

As noted previously, the total emitted light may be the combination from red, green and blue light-emitting elements, and, optionally, a second green light emitting element. In certain embodiments, these elements may be phosphors that emit light when energized, as is conventionally known. Generally, a red light-emitting phosphor may comprise one or more selected from $Y_2O_3:Eu$; $3.5MgO*0.5MgF_2*GeO_2:Mn^{4+}$; $Gd(Zn,Mg)B_5O_{10}:Ce,Mn$; $(Sr, Mg)_3(PO_4)_2:Sn^{2+}$; $Y(V,P)O_4:Eu$; or the like.

Generally, a green light-emitting phosphor may comprise one or more selected from $(Ba,Sr,Ca)MgAl_{10}O_{17}:Eu^2, Mn^{2+}$; $LaPO_4:Ce,Tb$; $Zn_2SiO_4:Mn$; $(Ce,Tb)MgAl_{11}O_{19}$; $(Ce,Tb)(Mg,Mn)Al_{11}O_{19}$; $(Ce,La)(Mg,Mn)Al_{11}O_{19}$; $SrAl_{12}O_{19}:Mn^{2+}$; or the like. Where a second green light-emitting phosphor is used, it may also be chosen from the above, provided the second green light-emitting phosphor is different from the first green light-emitting phosphor. Generally, a blue light-emitting phosphor may comprise one or more selected from a $(Ba,Sr,Ca)MgAl_{10}O_{17}:Eu^{2+}$; $(Sr,Ba,Ca,Mg)_5(PO_4)_3Cl:Eu^{2+}$; $Sr_4Al_{14}O_{25}:Eu^{2+}$; or the like.

In the above phosphors, the element(s) following the colon represents activator(s). The various phosphors of any color described herein can have different elements enclosed in parentheses and separated by commas, such as in $(Ba,Sr,Ca)MgAl_{10}O_{17}:Eu^{2+},Mn^{2+}$ phosphor. As would be understood by anyone skilled in the art, the notation (A,B,C) signifies $(A_xB_yC_z)$ where $0 \leq x \leq 1$ and $0 \leq y \leq 1$ and $0 \leq z \leq 1$ and $x+y+z=1$. For example, (Sr,Ca,Ba) signifies $(Sr_xCa_yBa_z)$ where $0 \leq x \leq 1$ and $0 \leq y \leq 1$ and $0 \leq z \leq 1$ and $x+y+z=1$. Typically, but not always, x, y, and z are all nonzero. The notation (A,B) signifies $(A_xB_y)$ where $0 \leq x \leq 1$ and $0 \leq y \leq 1$ and $x+y=1$. Typically, but not always, x and y are both nonzero.

Figure 1:
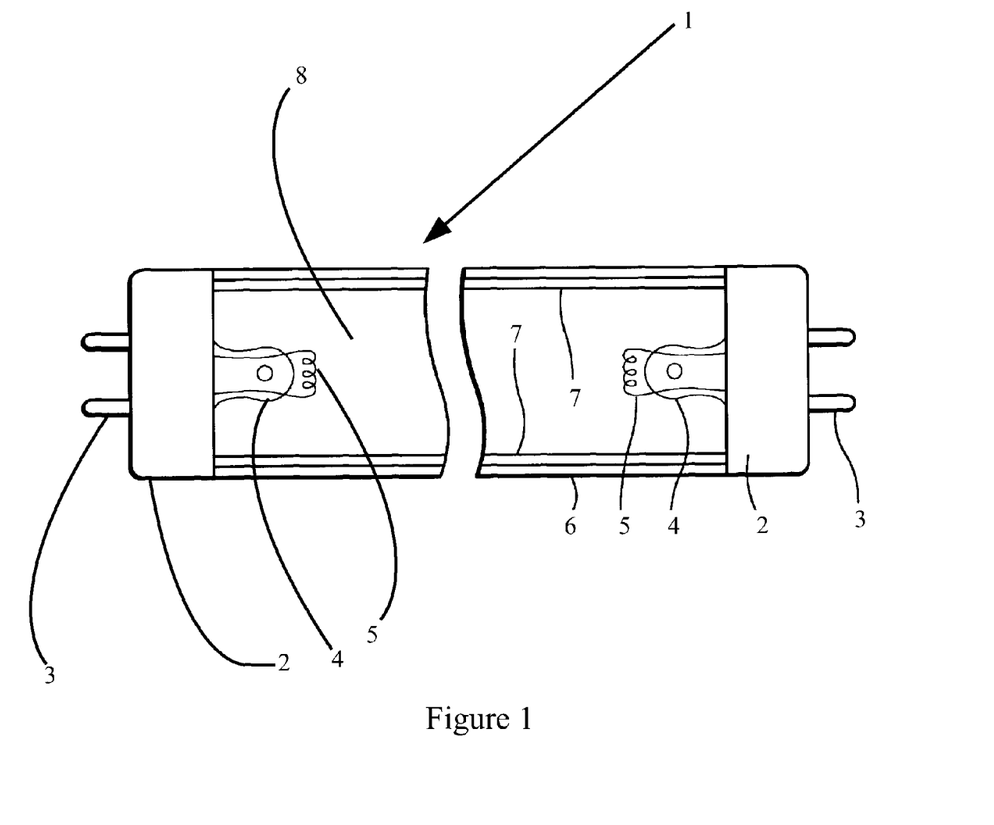
FIG. 1 shows diagramatically, and partially in section, a fluorescent lamp according to embodiments of the present disclosure.

Referring now to FIG. 1, herein is shown an exemplary embodiment of a vapor discharge fluorescent lamp 1. It will be appreciated that a variety of fluorescent lamps may be used with the present invention, including single or double ended lamps, curved or straight lamps, and electrodeless lamps. Such lamp may be low- or high-pressure, and may contain mercury vapor as a fill, or may be mercury-free, but will (in this exemplary embodiment) contain a vapor that supports a discharge. The fluorescent lamp 1 has a light-transmissive tube or envelope 6 formed from glass or other suitable material, which may have a circular cross-section. An inner surface (not specifically shown) of the glass envelope 6 is provided with a phosphor-containing layer 7. The lamp is typically hermetically sealed by bases 2, attached at ends of the tube, respectively. Usually two spaced electrodes 5 are respectively mounted on the bases 2, and can be supported by stems 4. The electrodes 5 are typically provided with current by pins 3 which are received in an electric socket. A discharge-sustaining fill 8, which may be formed from mercury and an inert gas, is sealed inside the glass tube. The inert gas is typically argon or a mixture of argon and other noble gases at low pressure, which, in combination with a small quantity of mercury, provide the low vapor pressure manner of operation.

The phosphor-containing layer 7 can be utilized in a low pressure mercury vapor discharge lamp, as described, but may also be used in a high pressure mercury vapor discharge lamp or a mercury-free lamp. It may be used in fluorescent lamps having electrodes as is known in the art, as well as in electrodeless fluorescent lamps as are known in the art, where the means for providing a discharge is a structure which provides high frequency electromagnetic energy or radiation.

As is known in the art, phosphors change the wavelength spectra of light striking the phosphor so that the emission spectrum of a lamp can be adjusted. Non-useful light, such as light in the UV range of the spectrum, can be converted to useful light in the visible range. The phosphor-containing layer 7 contains a blend of phosphor particles which are selected to achieve a desired color quality. In general, the phosphors which characterize phosphor mixtures have discrete spectra which will yield good color rendering of objects whose colors match the spectral peaks, but not as good rendering of objects whose colors lie between the spectral peaks. By combining phosphors having complementary spectra, a good color rendering over the entire spectra may be achieved.

Individual phosphor material amounts used in the phosphor composition of the phosphor layer 7 will vary depending upon the desired color spectra and/or color temperature. The relative amount of a phosphor material can be described by its spectral weight. That is, the spectral weight is the amount each phosphor material supplies to the overall emission spectra. It is to be understood that one of ordinary skill in the art would appreciate that other phosphor compounds having similar emission spectra may be used in the phosphor compositions described herein. The weight percent of each phosphor composing the phosphor layer 7 may vary depending on the characteristics of the desired light output.

In an alternative embodiment, the lamp of the present disclosure can be a compact fluorescent lamp (CFL) having a folded or wrapped topology so that the overall length of the lamp is much shorter than the unfolded length of the glass tube.

In order to promote a further understanding of the invention, the following examples are provided. These examples are shown by way of illustration and not limitation.

EXAMPLES

Example 1

Figure 2:
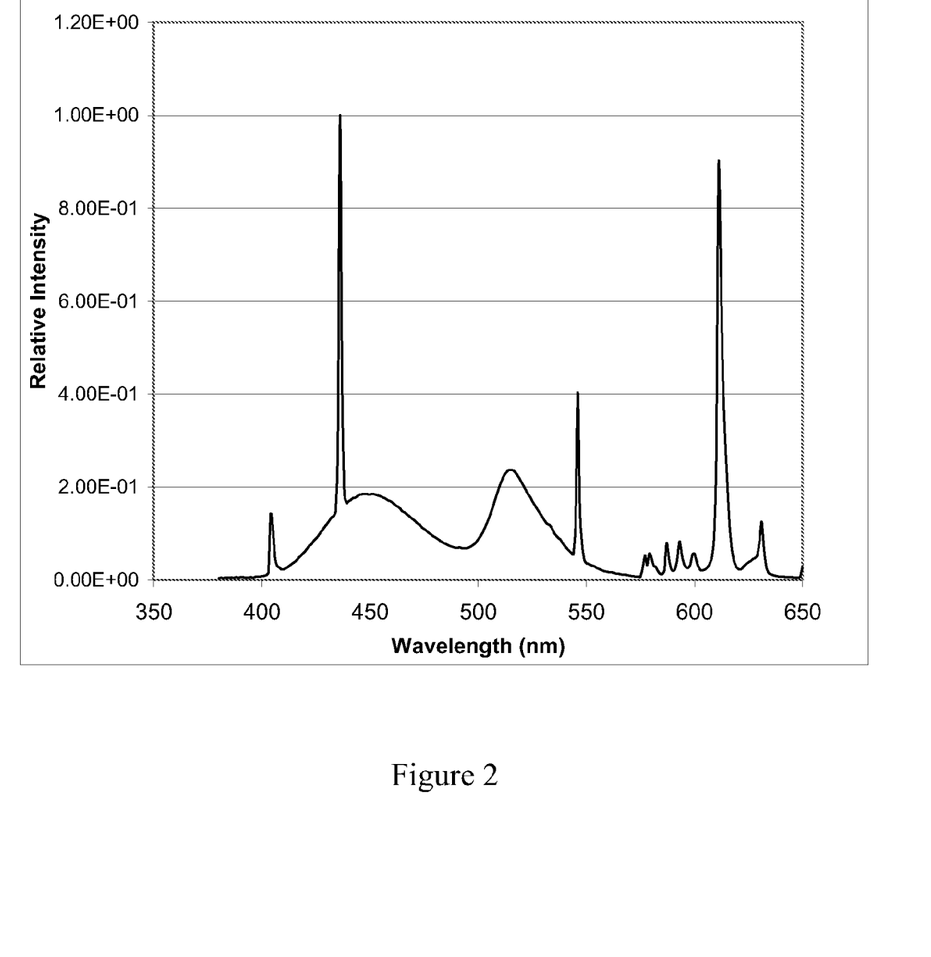
FIG. 2 is an emission spectrum for fluorescent lamp in accordance with embodiments of the present disclosure.

A F32 T8 fluorescent lamp was constructed with a phosphor layer comprising Yttrium Oxide:Eu ($Y_2O_3$:Eu) (YEO); (Ba,Sr,Ca)MgAl$_{10}$O$_{17}$:Eu$^{2+}$ (BAM) and (Ba,Sr,Ca)MgAl$_{10}$O$_{17}$:Eu$^{2+}$,Mn$^{2-}$ (BAMn). The construction details and method for making F32 T8-type lamps are generally known in the field, apart from the inventive phosphor combinations described in this and other examples of the invention. The weight percents of the above three phosphors (based on total combined phosphor weight) were 40.00 wt %, 31.00 wt % and 29.00 wt %, respectively. The lamp comprised a barrier layer between the glass envelope and the phosphor layer. The emission spectra for the lamp of this Example is shown in FIG. 2. It is to be noted that essentially equivalent spectra are to be obtained with other fluorescent lamp types. When energized, the lamp generated light with a CCT of about 17636 K and the follow chromaticity coordinates (x,y): (0.2585, 0.2625). Its operating lumens/watt (LPW) value was about 62.4 and its CRI Ra value was 73.5. Its aggregate $Q_a$ value in the CQS system was 76. The light from this lamp exhibited delta chroma values for each of the fifteen color samples of the CQS system as shown in the second column of Table XI as follows.

TABLE XI

| CQS Color Sample | Delta Chroma Values for Lamp of Example 1 | Delta Chroma Values for Lamp of Example 2 | Delta Chroma Values for Lamp of Comparative Example 1 |
|---|---|---|---|
| VS1 | −0.4 | 0.1 | 0.8 |
| VS2 | 2.0 | 2.8 | 3.9 |
| VS3 | −3.1 | 1.8 | 10.1 |
| VS4 | 0.2 | −0.6 | 4.6 |
| VS5 | 10.1 | 2.0 | −7.3 |
| VS6 | 15.8 | 5.6 | −9.5 |
| VS7 | 19.1 | 9.3 | −4.8 |
| VS8 | 9.4 | 6.8 | 3.4 |
| VS9 | −1.4 | 4.0 | 11.4 |
| VS10 | −2.5 | 2.0 | 8.7 |
| VS11 | −3.2 | −1.3 | 3.8 |
| VS12 | 2.9 | 0.2 | −2.4 |
| VS13 | 10.3 | 5.2 | −2.2 |
| VS14 | 6.0 | 1.8 | −5.1 |
| VS15 | 2.1 | −0.2 | −3.6 |

Example 2

Figure 3:
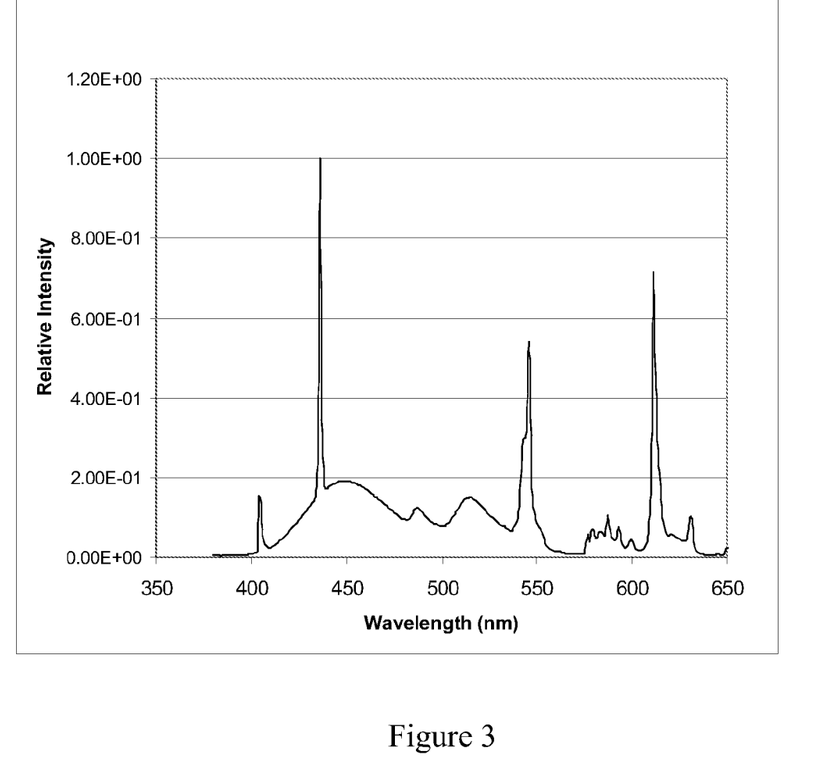
FIG. 3 is an emission spectrum for another fluorescent lamp in accordance with embodiments of the present disclosure.

Another F32 T8 fluorescent lamp was constructed with a phosphor layer comprising Yttrium Oxide:Eu ($Y_2O_3$:Eu) (YEO); (Ba,Sr,Ca)MgAl$_{10}$O$_{17}$:Eu$^{2+}$ (BAM); (Ba,Sr,Ca)MgAl$_{10}$O$_{17}$:Eu$^{2+}$,Mn$^{2-}$ (BAMn); and additionally, LaPO$_4$:Ce,Tb (LAP). The weight percents (based on total weight of the phosphors) of the four phosphors were: 33.00 wt %, 34.40 wt %, 17.60 wt % and 15.00 wt %, respectively. The lamp comprised a barrier layer between the glass envelope and the phosphor layer. The emission spectra for the lamp of this Example is shown in FIG. 3. Essentially equivalent spectra would be obtained with other fluorescent lamp types. When energized, the lamp generated light with a CCT of about 17952 K and the follow chromaticity coordinates (x,y): (0.2598, 0.2600). Its operating lumens/watt (LPW) value was about 65.1 and its CRI Ra value was 85.0. Its aggregate $Q_a$ value in the CQS system was 89. The light from this lamp exhibited delta chroma values for each of the fifteen color samples of the CQS system as shown in the third column of Table XI above.

Comparative Example 1

In this Comparative Example, a typical F32 T8 fluorescent lamp was constructed, but this time using a conventional "triphosphor" layer composition of a type typically used, at a relatively high CCT. It was used to provide a baseline for comparative purposes. This lamp was constructed with a triphosphor layer comprising Yttrium Oxide:Eu ($Y_2O_3$:Eu) (YEO); (Ba,Sr,Ca)MgAl$_{10}$O$_{17}$:Eu$^{2+}$ (BAM); and LaPO$_4$:Ce,Tb (LAP). The weight percents (based on total weight of the phosphors) of the phosphors were: 21.00 wt % YEO, 38.00 wt % BAM, and 41.00 wt % LAP, respectively. When energized, the lamp generated light with a CCT of about 17993 K and the follow chromaticity coordinates (x,y): (0.2610, 0.2585). Its operating lumens/watt (LPW) value was about 71.7 and its CRI Ra value was 82.0. Its aggregate $Q_a$ value in the CQS system was 76. The light from this lamp exhibited delta chroma values for each of the fifteen color samples of the CQS system as shown in the fourth column of Table XI above.

One key distinguishing feature between the lamps of Examples 1 and 2 on the one hand, and that of Comparative Example 1 on the other, is that a targeted group of individuals reported excellent color rendering of by the lamps of Examples 1 and 2, compared to illumination by the conventional triphosphor lamp of Comparative Example 1. Despite the fact that all three lamps had relative high aggregate Ra and $Q_a$ values in the CRI and CQS systems, the distinction was nevertheless apparent. This is due to the inventive VS values for certain CQS color chips, which chips are chosen for their relatively high chromatic saturation.

Further Examples

In the following Table XII is described the formulation for exemplary phosphor blends for CCT 5000 K. Also described is a conventional triphosphor blend at CCT of 5000 K, in a Comparative Example.

TABLE XII

| | Example | | Comparative |
|---|---|---|---|
| | Example 3 | Example 4 | Example 2 |
| Lamp Type | F32 T8 | F32 T8 | F32 T8 |
| CCT | 5000 | 5000 | 5000 |
| Phosphor Composition in weight percent: | | | |
| YEO | 62 | 53 | 47 |
| LAP | 0 | 21 | 36 |
| BAM | 11 | 15 | 17 |
| BAMn | 27 | 11 | 0 |
| x coordinate | 0.346 | 0.346 | 0.346 |
| y coordinate | 0.359 | 0.359 | 0.359 |
| Ra | 70 | 90 | 82 |
| CQS (Qa) | 70 | 89 | 79 |
| VS1 | −2.3 | −1.7 | −1.3 |
| VS2 | 0.4 | 1.7 | 2.4 |
| VS3 | −3.9 | 0.2 | 3.7 |
| VS4 | 4.8 | −1.7 | −2.3 |
| VS5 | 12.6 | −0.8 | −6.8 |
| VS6 | 18.7 | 1.5 | −7.7 |
| VS7 | 20.2 | 4.3 | −3.8 |

TABLE XII-continued

| | Example | | |
|---|---|---|---|
| | Example 3 | Example 4 | Comparative Example 2 |
| VS8 | 6.0 | 3.8 | 3.1 |
| VS9 | −5.1 | 3.5 | 8.1 |
| VS10 | −4.1 | 1.7 | 5.3 |
| VS11 | −1.8 | −1.3 | 0.2 |
| VS12 | 4.0 | −0.5 | −2.5 |
| VS13 | 9.9 | 2.7 | −1.3 |
| VS14 | 2.4 | −3.6 | −7.2 |
| VS15 | −0.6 | −4.4 | −6.6 |

In the table XII above, the VS values for Examples 3 and 4 fall within the ranges for a medium color temperature embodiment described earlier.

In the following Table XIII is described the formulation for exemplary phosphor blends for CCT 3500 K, and a Comparative Example of a conventional triphosphor blend at CCT 3500 K.

TABLE XIII

| | Example | | |
|---|---|---|---|
| | Example 5 | Example 6 | Comparative Example 3 |
| Lamp Type | F32 T8 | F32 T8 | F32 T8 |
| CCT | 3500 | 3500 | 3500 |
| Phosphor Composition (weight %): | | | |
| YEO | 71 | 65 | 62 |
| LAP | 0 | 22 | 30 |
| BAM | 4 | 6 | 8 |
| BAMn | 25 | 7 | 0 |
| x coordinate | 0.413 | 0.413 | 0.413 |
| y coordinate | 0.393 | 0.393 | 0.393 |
| Ra | 85 | 87 | 86 |
| CQS (Qa) | 68 | 86 | 82 |
| VS1 | −2.6 | −1.7 | −1.4 |
| VS2 | 0.9 | 2.5 | 3.0 |
| VS3 | −3.9 | −1.4 | 0.4 |
| VS4 | 5.6 | −2.4 | −3.7 |
| VS5 | 12.4 | −1.2 | −5.3 |
| VS6 | 19.3 | 1.6 | −4.6 |
| VS7 | 20.9 | 4.7 | −0.8 |
| VS8 | 4.8 | 4.2 | 4.4 |
| VS9 | −5.4 | 4.5 | 8.0 |
| VS10 | −3.5 | 3.4 | 6.2 |
| VS11 | −1.4 | −0.4 | 0.6 |
| VS12 | 3.5 | 0.2 | −0.8 |
| VS13 | 8.4 | 2.5 | 0.3 |
| VS14 | −0.8 | −5.8 | −7.8 |
| VS15 | −3.6 | −6.9 | −8.1 |

In the Table XIII above, the VS values for Examples 5 and 6 fall within the ranges for a low color temperature embodiment described earlier.

It is believed that by employing the color rendering approach described in the present specification, lamps can be made and/or adapted which emanate light that allows objects to appear more appealing or natural. In particular, some such objects which may benefit include those having wood color, wood grain color, and skin tones. Furthermore, and without being limited by theory, it is currently believed that lamps according to embodiments of the present disclosure may be capable of having an effect upon the human body in terms of sleep cycles, in cases where such lamps emit a substantial blue components.

While examples have been presented utilizing phosphors as light-emitting elements, one of skill can build or adapt a lamp (using any combination light-emitting elements disclosed herein) having the same CQS color rendering properties, by ascertaining the spectral patterns of the lamps made in accordance with these examples. One would choose light emitting elements which match the spectra of the phosphors in the inventive blends described in the examples above.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A lamp which when energized exhibits a correlated color temperature of between about 3000 kelvin to about 4500 kelvin and having an improved color quality scale, the lamp comprising:
   at least one light-emitting element having a light emission when energized; and
   wherein when said lamp is energized said lamp generates light with a total light emission having delta chroma values as follows:
   at least two color samples of the CQS are within the parameters
   −5 to 2 for VS1;
   −2 to 5 for VS2;
   −5 to 0 for VS3;
   at least one color sample of the CQS is within the parameters
   −2.5 to 8 for VS4;
   −2 to 15 for VS5;
   at least two color samples of the CQS are within the parameters
   0 to 21 for VS6;
   3 to 22 for VS7;
   2 to 7 for VS8;

at least two color samples of the CQS are within the parameters
−6 to 5.5 for VS9;
−4 to 5 for VS10;
−4 to 2 for VS11;
at least one color sample of the CQS is within the parameters
−0.5 to 5 for VS12;
1 to 12 for VS13; and
at least one color sample of the CQS is within the parameters
−7 to 4 for VS14;
−7 to 7 for VS15;
wherein said delta chroma values are measured in the CIE LAB space;
with the proviso that the lamp does not comprise an incandescent light-emitting element, wherein the lamp is a low pressure mercury vapor discharge lamp optionally supplemented by one or more of OLED and LED, and wherein said at least one light-emitting element is phosphor.

2. The lamp of claim 1, comprising:
a combination of two or more light-emitting elements, said combination comprising a red light-emitting element having a peak emission in the range of from about 590 to about 670 nm, a first green light-emitting element having a peak emission in the range of from about 500 to about 570 nm, and a blue light-emitting element having a peak emission in the range of from about 430 to about 490 nm,
wherein a single light emitting element may emit one or more colors;
and optionally further comprising at least one of an amber light emitting element and a blue-green light emitting element.

3. The lamp of claim 2, wherein each of the peak emission for said red light-emitting element, said first green light-emitting element, and said blue light-emitting element has a half-value width of about 1 to about 100 nm.

4. The lamp of claim 2, wherein said combination further comprises a second green light-emitting element different from said first green light emitting element and having a peak emission in the range of from about 530 to about 560 nm and a half-value width of about 1 to about 20 nm.

5. The lamp of claim 2, wherein said red light-emitting element comprises a phosphor selected from the group consisting of:
$Y_2O_3$:Eu; $3.5MgO*0.5MgF_2*GeO_2$:$Mn^{4+}$; Gd(Zn,Mg)$B_5O_{10}$:Ce,Mn; and $(Sr, Mg)_3(PO_4)_2$:$Sn^{2+}$.

6. The lamp of claim 2, wherein said first green light-emitting element comprises a phosphor selected from the group consisting of
$(Ba,Sr,Ca)MgAl_{10}O_{17}$:$Eu^{2+}$, $Mn^{2+}$; $LaPO_4$:Ce,Tb; $Zn_2SiO_4$:Mn; $(Ce,Tb)MgAl_{11}O_{19}$; $(Ce,Tb)(Mg,Mn)Al_{11}O_{19}$; $(Ce,La)(Mg,Mn)Al_{11}O_{19}$; and $SrAl_{12}O_{19}$:$Mn^{2+}$.

7. The lamp of claim 2, wherein said blue light-emitting element comprises a phosphor selected from the group consisting of:
$(Ba,Sr,Ca)MgAl_{10}O_{17}$:$Eu^{2+}$; $(Sr,Ba,Ca,Mg)_5(PO_4)_3Cl$:$Eu^{2+}$; and $Sr_4Al_{14}O_{25}$:$Eu^{2+}$.

8. The lamp of claim 1, wherein said lamp is fluorescent lamp.

9. The lamp of claim 8, wherein said lamp is a fluorescent lamp comprising a light-transmissive envelope, a fill gas sealed inside said envelope, wherein at least one of said light-emitting elements is a phosphor.

10. The lamp of claim 1,
wherein when said lamp is energized said lamp generates light with a total light emission having delta chroma values as follows:
at least two color samples of the CQS are within the parameters
−5 to 2 for VS1;
−2 to 5 for VS2;
−4 to −1 for VS3;
at least one color sample of the CQS is within the parameters
−2.5 to 6 for VS4;
−2 to 13 for VS5;
at least two color samples of the CQS are within the parameters
1 to 20 for VS6;
3 to 21 for VS7;
2 to 7 for VS8;
at least two color samples of the CQS are within the parameters
−6 to 5 for VS9;
−4 to 4 for VS10;
−4 to 2 for VS11;
at least one color sample of the CQS is within the parameters
0 to 4 for VS12;
2 to 10 for VS13; and
at least one color sample of the CQS is within the parameters
−6 to 2 for VS14;
−7 to 6 for VS15.

11. A lamp which when energized exhibits a correlated color temperature of between about 4500 kelvin to about 7500 kelvin and having an improved color quality scale, the lamp comprising:
at least one light-emitting element having a light emission when energized; and
wherein when said lamp is energized said lamp generates light with a total light emission having delta chroma values as follows:
at least two color samples of the CQS are within the parameters
−5 to 2 for VS1;
−2 to 4 for VS2;
−5 to 3 for VS3;
at least one color sample of the CQS is within the parameters
−2 to 5 for VS4;
−2 to 15 for VS5;
at least two color samples of the CQS are within the parameters
0 to 20 for VS6;
1 to 22 for VS7;
2 to 8 for VS8;
at least two color samples of the CQS are within the parameters
−5.5 to 5.5 for VS9;
−5 to 4 for VS10;
−4 to 1 for VS11;
at least one color sample of the CQS is within the parameters
−1.5 to 6 for VS12;
0.5 to 12 for VS13; and
at least one color sample of the CQS is within the parameters
−5 to 6 for VS14;
−5.5 to 5 for VS15, wherein said delta chroma values are measured in the CIE LAB space;

with the proviso that the lamp does not comprise an incandescent light-emitting element, wherein the lamp is a low pressure mercury vapor discharge lamp optionally supplemented by one or more of OLED and LED, and wherein said at least one light-emitting element is phosphor.

12. The lamp of claim 11, comprising:

a combination of two or more light-emitting elements, said combination comprising a red light-emitting element having a peak emission in the range of from about 590 to about 670 nm, a first green light-emitting element having a peak emission in the range of from about 500 to about 570 nm, and a blue light-emitting element having a peak emission in the range of from about 430 to about 490 nm, wherein a single light emitting element may emit one or more colors;

and optionally further comprising at least one of an amber light emitting element and a blue-green light emitting element.

13. The lamp of claim 12, wherein each of the peak emission for said red light-emitting element, said first green light-emitting element, and said blue light-emitting element has a half-value width of about 1 to about 100 nm.

14. The lamp of claim 12, wherein said combination further comprises a second green light-emitting element different from said first green light emitting element and having a peak emission in the range of from about 530 to about 560 nm and a half-value width of about 1 to about 20 nm.

15. The lamp of claim 12, wherein said red light-emitting element comprises a phosphor selected from the group consisting of:

$Y_2O_3$:Eu; $3.5MgO*0.5MgF_2*GeO_2$:$Mn^{4+}$; Gd(Zn,Mg)$B_5O_{10}$:Ce,Mn; and $(Sr, Mg)_3(PO_4)_2$:$Sn^{2+}$.

16. The lamp of claim 12, wherein said first green light-emitting element comprises a phosphor selected from the group consisting of:

$(Ba,Sr,Ca)MgAl_{10}O_{17}$:$Eu^{2+}$, $Mn^{2+}$; $LaPO_4$:Ce,Tb; $Zn_2SiO_4$:Mn; $(Ce,Tb)MgAl_{11}O_{19}$; $(Ce,Tb)(Mg,Mn)Al_{11}O_{19}$; $(Ce,La)(Mg,Mn)Al_{11}O_{19}$; and $SrAl_{11}O_{19}$:$Mn^{2+}$.

17. The lamp of claim 12, wherein said blue light-emitting element comprises a phosphor selected from the group consisting of:

$(Ba,Sr,Ca)MgAl_{10}O_{17}$:$Eu^{2+}$; $(Sr,Ba,Ca,Mg)_5(PO_4)_3Cl$:$Eu^{2+}$; and $Sr_4Al_{14}O_{25}$:$Eu^{2+}$.

18. The lamp of claim 11, wherein said lamp is fluorescent lamp.

19. The lamp of claim 18, wherein said lamp is a fluorescent lamp comprising a light-transmissive envelope, a fill gas sealed inside said envelope, wherein at least one of said light-emitting elements is a phosphor.

20. The lamp of claim 11, wherein when said lamp is energized said lamp generates light with a total light emission having delta chroma values as follows:

at least two color samples of the CQS are within the parameters
−5 to 0 for VS1;
−2 to 4 for VS2;
−4.5 to 2 for VS3;
at least one color sample of the CQS is within the parameters
−2 to 5 for VS4;
−2 to 13 for VS5;
at least two color samples of the CQS are within the parameters
1 to 20 for VS6;
2 to 21 for VS7;
2 to 8 for VS8;
at least two color samples of the CQS are within the parameters
−5.5 to 5 for VS9;
−5 to 3 for VS10;
−4 to 1 for VS11;
at least one color sample of the CQS is within the parameters
−0.5 to 4 for VS12;
1 to 10 for VS13; and
at least one color sample of the CQS is within the parameters
−4 to 4 for VS14;
−5 to 3 for VS15.

21. A lamp which when energized exhibits a correlated color temperature of between about 7500 kelvin to about 20000 kelvin and having an improved color quality scale, the lamp comprising:

at least one light-emitting element having a light emission when energized; and wherein when said lamp is energized said lamp generates light with a total light emission having delta chroma values as follows:

at least two color samples of the CQS are within the parameters
−2 to 2 for VS1;
0 to 5 for VS2;
−5 to 5.5 for VS3;
at least one color sample of the CQS is within the parameters
−2.5 to 4 for VS4;
−3 to 15 for VS5;
at least two color samples of the CQS are within the parameters
1 to 22 for VS6;
0 to 23 for VS7;
4 to 11 for VS8;
at least two color samples of the CQS are within the parameters
−4.5 to 6 for VS9;
−4 to 5 for VS10;
−4 to 1 for VS11;
at least one color sample of the CQS is within the parameters
−1.5 to 6 for VS12;
1 to 13 for VS13; and
at least one color sample of the CQS is within the parameters
−3 to 7 for VS14;
−3 to 8 for VS15, wherein said delta chroma values are measured in the CIE LAB space;

with the proviso that the lamp does not comprise an incandescent light-emitting element, wherein the lamp is a low pressure mercury vapor discharge lamp optionally supplemented by one or more of OLED and LED, and wherein said at least one light-emitting element is phosphor.

22. The lamp of claim 21, comprising:

a combination of two or more light-emitting elements, said combination comprising a red light-emitting element having a peak emission in the range of from about 590 to about 670 nm, a first green light-emitting element having a peak emission in the range of from about 500 to about 570 nm, and a blue light-emitting element having a peak emission in the range of from about 430 to about 490 nm, wherein a single light emitting element may emit one or more colors;

and optionally further comprising at least one of an amber light emitting element and a blue-green light emitting element.

23. The lamp of claim 22, wherein each of the peak emission for said red light-emitting element, said first green light-emitting element, and said blue light-emitting element has a half-value width of about 1 to about 100 nm.

24. The lamp of claim 22, wherein said combination further comprises a second green light-emitting element different from said first green light emitting element and having a peak emission in the range of from about 530 to about 560 nm and a half-value width of about 1 to about 20 nm.

25. The lamp of claim 22, wherein said red light-emitting element comprises a phosphor selected from the group consisting of:

$Y_2O_3$:Eu; $3.5MgO*0.5MgF_2*GeO_2$:$Mn^{4+}$; $Gd(Zn,Mg)B_5O_{10}$:Ce,Mn; and $(Sr, Mg)_3(PO_4)_2$:$Sn^{2+}$.

26. The lamp of claim 22, wherein said first green light-emitting element comprises a phosphor selected from the group consisting of:

$(Ba,Sr,Ca)MgAl_{10}O_{17}$:$Eu^{2+}$, $Mn^{2+}$; $LaPO_4$:Ce,Tb; $Zn_2SiO_4$:Mn; $(Ce,Tb)MgAl_{11}O_{19}$; $(Ce,Tb)(Mg,Mn)Al_{11}O_{19}$; $(Ce,La)(Mg,Mn)Al_{11}O_{19}$; and $SrAl_{12}O_{19}$:$Mn^{2+}$.

27. The lamp of claim 22, wherein said blue light-emitting element comprises a phosphor selected from the group consisting of:

$(Ba,Sr,Ca)MgAl_{10}O_{17}$:$Eu^{2+}$; $(Sr,Ba,Ca,Mg)_5(PO_4)_3Cl$:$Eu^{2+}$; and $Sr_4Al_{14}O_{25}$:$Eu^{2+}$.

28. The lamp of claim 21, wherein said lamp is fluorescent lamp.

29. The lamp of claim 28, wherein said lamp is a fluorescent lamp comprising a light-transmissive envelope, a fill gas sealed inside said envelope, wherein at least one of said light-emitting elements is a phosphor.

30. The lamp of claim 21, wherein when said lamp is energized said lamp generates light with a total light emission having delta chroma values as follows:

at least two color samples of the CQS are within the parameters

−2 to 2 for VS1;
0 to 5 for VS2;
−4 to 4 for VS3;

at least one color sample of the CQS is within the parameters

−1.5 to 3 for VS4;
−1 to 13 for VS5;

at least two color samples of the CQS are within the parameters 1 to 20 for VS6;
3 to 21 for VS7;
4 to 11 for VS8;

at least two color samples of the CQS are within the parameters

−3.5 to 5 for VS9;
−3 to 5 for VS10;
−4 to 1 for VS11;

at least one color sample of the CQS is within the parameters

−1 to 5 for VS12;
2 to 12 for VS13; and at least one color sample of the CQS is within the parameters −3 to 6 for VS14;
−3 to 3 for VS15.

31. The lamp in accordance with any one of claim 1, 11 or 21, with the proviso that the lamp does not comprise Y(V,P)O$_4$:Eu phosphor.

* * * * *